(12) United States Patent
Fukuda et al.

(10) Patent No.: US 9,440,161 B2
(45) Date of Patent: Sep. 13, 2016

(54) SPRAY DRYING APPARATUS FOR DEHYDRATED FILTRATE FROM DESULFURIZATION WASTE WATER, AND AIR POLLUTION CONTROL SYSTEM

(75) Inventors: Toshihiro Fukuda, Tokyo (JP); Tatsuto Nagayasu, Tokyo (JP); Seiji Kagawa, Tokyo (JP); Naoyuki Kamiyama, Tokyo (JP); Nobuyuki Ukai, Tokyo (JP)

(73) Assignee: MITSUBISHI HITACHI POWER SYSTEMS, LTD., Yokohama, Kanagawa (JP)

( * ) Notice: Subject to any disclaimer, the term of this patent is extended or adjusted under 35 U.S.C. 154(b) by 369 days.

(21) Appl. No.: 14/111,943

(22) PCT Filed: May 30, 2012

(86) PCT No.: PCT/JP2012/063997
§ 371 (c)(1),
(2), (4) Date: Oct. 15, 2013

(87) PCT Pub. No.: WO2012/165509
PCT Pub. Date: Dec. 6, 2012

(65) Prior Publication Data
US 2014/0045131 A1    Feb. 13, 2014

(30) Foreign Application Priority Data

May 31, 2011    (JP) .................................. 2011-122502

(51) Int. Cl.
*B01D 1/20*    (2006.01)
*B01D 1/18*    (2006.01)
(Continued)

(52) U.S. Cl.
CPC . *B01D 1/18* (2013.01); *B01D 1/20* (2013.01); *B01D 53/504* (2013.01);
(Continued)

(58) Field of Classification Search
None
See application file for complete search history.

(56) References Cited

U.S. PATENT DOCUMENTS 2,670,036 A * 2/1954 Spalding .................. B01D 1/18
159/4.02
3,375,066 A    3/1968 Murakami
(Continued)

FOREIGN PATENT DOCUMENTS

CN        202105834 U  *  1/2012
EP          0049585 A1     4/1982
(Continued)

OTHER PUBLICATIONS

Translation of CN202105834U—accessed Feb. 3, 2016.*
(Continued)

*Primary Examiner* — Duane Smith
*Assistant Examiner* — Phillip Shao
(74) *Attorney, Agent, or Firm* — Westerman, Hattori, Daniels & Adrian, LLP

(57) ABSTRACT

A spray drying apparatus includes: a gas inlet provided in a side wall in the vicinity of a top (lid) portion of the spray drying apparatus, for introducing a flue gas for drying a spray of dehydrated filtrate; flow-adjusting plates provided in a body of the spray drying apparatus, for decelerating the introduced flue gas so as to change the flow of the flue gas to a laminar flow; a spray nozzle for spraying the dehydrated filtrate from the desulfurization waste water into the flue gas having been changed to the laminar flow; and a joining unit for joining a bottom portion of the body of the spray drying apparatus to a gas supply line that is a main flue gas duct for the flue gas so as to discharge spray-dried solids to the main flue gas duct.

14 Claims, 4 Drawing Sheets

(51) Int. Cl.
  *C02F 1/04* (2006.01)
  *B01D 53/50* (2006.01)
  *F26B 3/12* (2006.01)
  *C02F 1/12* (2006.01)
  *C02F 103/18* (2006.01)

(52) U.S. Cl.
  CPC ............ *B01D 53/505* (2013.01); *C02F 1/048* (2013.01); *F26B 3/12* (2013.01); *B01D 2251/404* (2013.01); *B01D 2257/404* (2013.01); *B01D 2257/602* (2013.01); *B01D 2258/0283* (2013.01); *C02F 1/12* (2013.01); *C02F 2103/18* (2013.01)

(56) References Cited

U.S. PATENT DOCUMENTS

| | | | | |
|---|---|---|---|---|
| 4,233,114 | A * | 11/1980 | Gastaldi | F26B 3/12 159/4.01 |
| 5,139,612 | A * | 8/1992 | Andersen | B01D 1/18 159/16.1 |
| 5,227,018 | A * | 7/1993 | Bro | F26B 3/12 159/16.1 |
| 2003/0180283 | A1* | 9/2003 | Batycky | A61K 9/0075 424/130.1 |
| 2010/0119428 | A1 | 5/2010 | Nagayasu et al. | |

FOREIGN PATENT DOCUMENTS

| | | |
|---|---|---|
| EP | 2716349 A1 | 4/2014 |
| GB | 634467 A | 3/1950 |
| JP | 58-53233 U | 4/1983 |
| JP | 63-200818 A | 8/1988 |
| JP | 03-098926 U | 10/1991 |
| JP | 05-212369 A | 8/1993 |
| JP | 09-066201 A | 3/1997 |
| JP | 09-313881 A | 12/1997 |
| JP | 2008-246406 A | 10/2008 |
| WO | 2010/146672 A1 | 12/2010 |

OTHER PUBLICATIONS

Notice of Allowance dated Jun. 2, 2015, issued in counterpart Japanese Application No. 2011-122502, with English translation (2 pages).
Extended European Search Report dated Oct. 24, 2014, issued in corresponding European Application No. 12792742.4. (7 pages).
International Search Report of PCT/JP2012/063997, mailing date of Sep. 18, 2012.
Written Opinion of PCT/JP2012/063997, mailing date of Sep. 18, 2012.
Translation of Written Opinion dated Sep. 18, 2012, issued in counterpart International Application No. PCT/JP2012/063997 (3 pages).
Non-Final Office Action dated Apr. 27, 2016, issued in U.S. Appl. No. 15/089,911 (22 pages).
Notice of Allowance dated Jul. 11, 2016, issued in U.S. Appl. No. 15/089,911.

* cited by examiner

SPRAY DRYING APPARATUS FOR DEHYDRATED FILTRATE FROM DESULFURIZATION WASTE WATER, AND AIR POLLUTION CONTROL SYSTEM

FIELD

The present invention relates to a spray drying apparatus for dehydrated filtrate from desulfurization waste water that is generated at the time of flue gas treatment for treating a flue gas discharged from a boiler, and an air pollution control system.

BACKGROUND

In the past, there has been known an air pollution control system that treats a flue gas discharged from a boiler installed in a thermal power facility or the like. The air pollution control system includes a denitration device that removes a nitrogen oxide from the flue gas discharged from the boiler, an air heater that recovers the heat of the flue gas having passed through the denitration device, a precipitator that removes soot and dust contained in the flue gas from which heat has been recovered, and a desulfurization device that removes a sulfur oxide contained in the flue gas from which soot and dust have been removed. A wet desulfurization device, which removes a sulfur oxide contained in a flue gas by bringing a limestone absorbent or the like into gas-liquid contact with the flue gas, is generally used as the desulfurization device.

A large amount of various toxic substances, such as ions such as chlorine ions and ammonium ions and mercury, are contained in waste water (hereinafter, referred to as "desulfurization waste water") discharged from the wet desulfurization device. For this reason, it is necessary to remove these toxic substances from the desulfurization waste water before the desulfurization waste water is discharged to the outside of a system. However, since treatment for removing these various toxic substances contained in the desulfurization waste water is complicated, there is a problem in that treatment costs are high. Accordingly, a method, which reuses desulfurization waste water in a system without discharging desulfurization waste water to the outside of a system, has been proposed to reduce the treatment costs for desulfurization waste water. For example, Patent Literatures 1 and 2 disclose an air pollution control apparatus including a facility that branches a flue gas from a flue gas duct of a main line to which a denitration device, an air heater, a precipitator, and a desulfurization device are connected, gasifies desulfurization waste water by spraying the desulfurization waste water, and is separately installed. The apparatus introduces a part of a flue gas to this facility from the flue gas duct of the main line, precipitates toxic substances by spraying the desulfurization waste water into the flue gas in the facility in order to evaporate the desulfurization waste water, and then returns the flue gas to the flue gas duct of the main line (Patent Literatures 1 and 2).

CITATION LIST

Patent Literature

Patent Literature 1: Japanese Laid-open Patent Publication No. 63-200818
Patent Literature 2: Japanese Laid-open Patent Publication No. 9-313881

SUMMARY

Technical Problem

In the air pollution control apparatus of Patent Literatures 1 and 2, the facility, which branches a part of the flue gas from the flue gas duct and gasifies the desulfurization waste water by spraying the desulfurization waste water (or waste liquid) discharged from the desulfurization device, is provided and the desulfurization waste water is evaporated. However, since the desulfurization waste water discharged from the desulfurization device contains solids, there is a problem in that the desulfurization waste water may not be sprayed and dried well.

In addition, recently, the elimination of waste water has been desired in the air pollution control facility due to the consideration for the environment of a water resource in an inland area or the like. Accordingly, the appearance of an air pollution control facility, which can stably operate and achieves the elimination of waste water, has been desired.

A spray dryer, which dries desulfurization waste water, can be used as a facility that achieves the elimination of waste water. However, when the desulfurization waste water is sprayed and dried using a flue gas of a boiler, there is the following problem.

High-concentration ashes are contained in the flue gas of the boiler. When the desulfurization waste water is further evaporated, a large amount of precipitated salt contained in the waste water is present. For this reason, a countermeasure against the precipitated salt is required.

The invention has been made in consideration of the above-mentioned problem, and an object of the invention is to provide a spray drying apparatus for dehydrated filtrate from desulfurization waste water that can achieve the elimination of desulfurization waste water from a desulfurization device, and an air pollution control system.

Solution to Problem

According to a first aspect of the present invention in order to solve the above-problems, there is provided a spray drying apparatus for dehydrated filtrate from desulfurization waste water, the spray drying apparatus including: a gas inlet provided in a side wall in the vicinity of a top portion of a body of the spray drying apparatus, for introducing a flue gas for drying a spray; flow-adjusting plates provided in the body of the spray drying apparatus, for decelerating the introduced flue gas so as to change the flow of the flue gas to a laminar flow; a spray nozzle for spraying dehydrated filtrate from desulfurization waste water into the flue gas having been changed to the laminar flow; and a joining unit for joining a bottom portion of the body of the spray drying apparatus to a main flue gas duct for the flue gas so as to discharge spray-dried solids to the main flue gas duct.

According to a second aspect of the present invention, there is provided the spray drying apparatus for dehydrated filtrate from desulfurization waste water according to the first aspect, further including: protective plates provided in the vicinity of a flue gas introduction area in the body of the spray drying apparatus, for preventing abrasion of an inner wall surface caused by solids contained in the flue gas.

According to a third aspect of the present invention, there is provided the spray drying apparatus for dehydrated filtrate from desulfurization waste water according to the first or second aspect, further including: a washing unit for washing an inner peripheral wall surface of the spray drying apparatus.

According to a fourth aspect of the present invention, there is provided an air pollution control system including: a boiler for combusting fuel; an air heater for recovering heat of a flue gas supplied from the boiler; a precipitator for removing soot and dust contained in the flue gas from which heat has been recovered; a desulfurization device for removing a sulfur oxide contained in the flue gas, from which soot and dust have been removed, by an absorbent; a dehydrator for removing gypsum from desulfurization waste water discharged from the desulfurization device; the spray drying apparatus according to any one of the first to third aspects including a spray unit for spraying dehydrated filtrate supplied from the dehydrator; and a flue gas introduction line for introducing a part of the flue gas to the spray drying apparatus.

Advantageous Effects of Invention

According to the invention, in the spray drying apparatus, the flue gas is changed to the laminar flow and the dehydrated filtrate from the desulfurization waste water is sprayed into the flue gas, which has been changed to the laminar flow, from the spray nozzle. Accordingly, the dehydrated filtrate is sprayed and dried well. In this case, abrasion caused by the flue gas to be introduced is prevented by the protective plates.

In addition, since a washing unit for washing the inner portion of the spray drying apparatus is provided, the generation of scale on the inner wall surface is prevented by the washing of the high-concentration ashes contained in the flue gas and a large amount of precipitated salt after spraying and drying.

BRIEF DESCRIPTION OF DRAWINGS

FIG. 3-1 is a cross-sectional view taken along line A-A of FIG. 2 and is a schematic diagram illustrating the installed state of protective plates that are provided at the top portion of the spray drying apparatus.

FIG. 3-2 is an enlarged view of a portion C of FIG. 3-1.

DESCRIPTION OF EMBODIMENTS

The invention will be described in detail below with reference to the drawings. Meanwhile, the invention is not limited by this embodiment. Further, when the invention includes a plurality of embodiments, the invention also includes the combination of the respective embodiments. Furthermore, elements of the following embodiments include elements that can be easily supposed by those skilled in the art, or substantially the same elements as the elements.

First Embodiment

Figure 1:
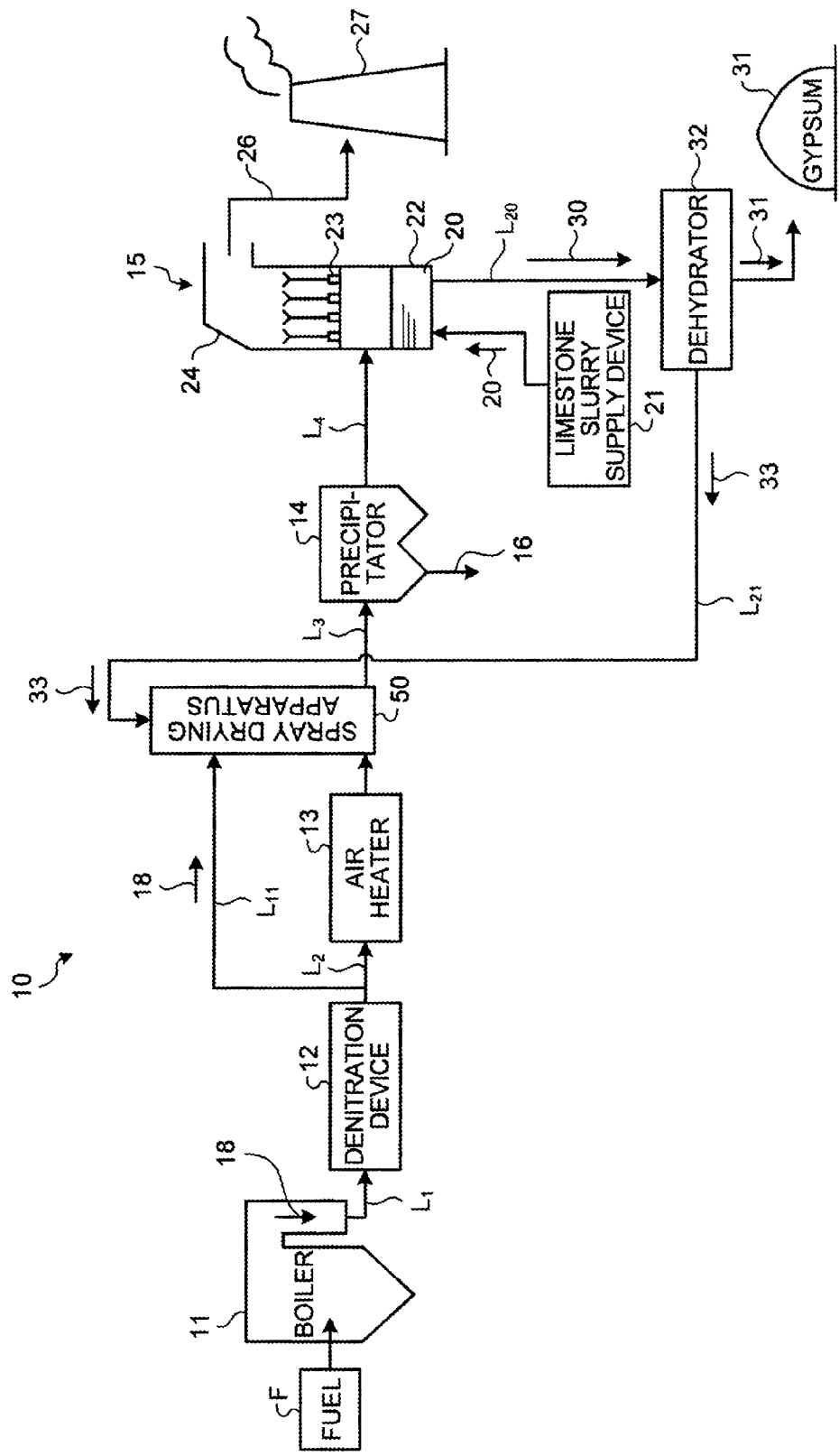
FIG. 1 is a schematic diagram illustrating the structure of an air pollution control system according to a first embodiment.

FIG. 1 is a schematic diagram illustrating the structure of an air pollution control system according to a first embodiment. An air pollution control system 10 illustrated in FIG. 1 is an apparatus that removes toxic substances, such as a nitrogen oxide ($NO_x$), a sulfur oxide ($SO_x$), and mercury (Hg), from a flue gas 18 supplied from a boiler 11, such as a coal fired boiler using coal as fuel or a heavy oil fired boiler using heavy oil as fuel.

The air pollution control system 10 includes a boiler 11 that combusts fuel F, a denitration device 12 that removes a nitrogen oxide contained in the flue gas 18 supplied from the boiler 11, an air heater 13 that recovers heat of the flue gas 18 having been subjected to denitration, a precipitator 14 that removes soot and dust contained in the flue gas 18 from which heat has been recovered, a desulfurization device 15 that removes a sulfur oxide contained in the flue gas 18, from which soot and dust have been removed, by using limestone slurry 20 that is an absorbent, a dehydrator 32 that removes gypsum 31 from desulfurization waste water 30 discharged from the desulfurization device 15, a spray drying apparatus 50 (a spray drying apparatus 50A or 50B described later) that includes a spray unit for spraying dehydrated filtrate 33 supplied from the dehydrator 32, and a flue gas introduction line $L_{11}$ through which a part of the flue gas 18 is introduced to the spray drying apparatus 50. Accordingly, since the dehydrated filtrate 33 from which the gypsum 31 has been removed is sprayed and dried in the spray drying apparatus 50 by the introduced flue gas 18, it is possible to stably achieve the elimination of waste water of the desulfurization waste water 30.

The denitration device 12 is a device that removes a nitrogen oxide contained in the flue gas 18 supplied from the boiler 11 through the gas supply line $L_1$, and includes a denitration catalyst layer (not illustrated) therein. A reducing agent injector (not illustrated) is disposed on the upstream side of the denitration catalyst layer, and a reducing agent is injected to the flue gas 18 from the reducing agent injector. Here, for example, ammonia, urea, ammonium chloride, and the like are used as the reducing agent. The nitrogen oxide contained in the flue gas 18 introduced to the denitration device 12 comes into contact with the denitration catalyst layer, so that the nitrogen oxide contained in the flue gas 18 is decomposed into a nitrogen gas ($N_2$) and water ($H_2O$) and is removed. Further, when the amount of chlorine (Cl) of mercury contained in the flue gas 18 is increased, the ratio of bivalent mercury chloride dissolvable in water is increased. Accordingly, mercury is easily collected by the desulfurization device 15 to be described below.

Meanwhile, the denitration device 12 is not essential. If the concentration of a nitrogen oxide contained in the flue gas 18 supplied from the boiler 11 or the concentration of mercury is low or these materials are not contained in the flue gas 18, the denitration device 12 may not be provided.

The air heater 13 is a heat exchanger that recovers the heat of the flue gas 18 supplied through a flue gas supply line $L_2$ after a nitrogen oxide is removed by the denitration device 12. Since the temperature of the flue gas 18, which has passed through the denitration device 12, is in the range of about 300° C. to 400° C., that is, high, heat exchange between the high-temperature flue gas 18 and room-temperature combustion air is performed by the air heater 13. The combustion air of which the temperature becomes high by the heat exchange is supplied to the boiler 11. Meanwhile, the flue gas 18, which has been subjected to heat exchange performed between the room-temperature combustion air and itself, is cooled to a temperature of about 150° C.

The precipitator 14 is to remove soot and dust contained in the flue gas 18, which is supplied through a gas supply line $L_3$, after heat recovery. Examples of the precipitator 14 include an inertial precipitator, a centrifugal precipitator, a filtration type precipitator, an electric precipitator, and a washing type precipitator, but the precipitator 14 is not particularly limited. Meanwhile, reference numeral 16 of FIG. 1 denotes collected dust ashes.

The desulfurization device 15 is a wet device that removes a sulfur oxide contained in the flue gas 18 supplied through a gas supply line $L_4$ after soot and dust are removed. Limestone slurry 20 (an aqueous solution obtained by dissolving limestone powder in water) is used as an alkaline absorbent in the desulfurization device 15, and temperature in the desulfurization device is adjusted in the range of about 30 to 80° C. The limestone slurry 20 is supplied to a bottom portion 22 of the desulfurization device 15 from a limestone slurry supply device 21. The limestone slurry 20, which is supplied to the bottom portion 22 of the desulfurization device 15, is sent to a plurality of nozzles 23, which are provided in the desulfurization device 15, through an absorbent supply line (not illustrated), and is ejected toward a top portion 24 from the nozzles 23. The flue gas 18, which rises from the bottom portion 22 of the desulfurization device 15, comes into gas-liquid contact with the limestone slurry 20 ejected from the nozzles 23, so that the sulfur oxide and mercury chloride contained in the flue gas 18 are absorbed in the limestone slurry 20 and are separated and removed from the flue gas 18. The flue gas 18, which is purified by the limestone slurry 20, is discharged from the top portion 24 of the desulfurization device 15 as a purified gas 26, and is discharged from a stack 27 to the outside of the system.

In the desulfurization device 15, the sulfur oxide $SO_x$ contained in the flue gas 18 causes a reaction, which is represented by the following formula (1), to the limestone slurry 20.

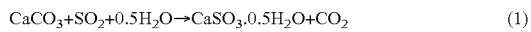

$$CaCO_3 + SO_2 + 0.5H_2O \rightarrow CaSO_3 \cdot 0.5H_2O + CO_2 \qquad (1)$$

In addition, the limestone slurry 20, which has absorbed $SO_x$ contained in the flue gas 18, is oxidized by air (not illustrated) supplied to the bottom portion 22 of the desulfurization device 15, and causes a reaction, which is represented by the following formula (2), to air.

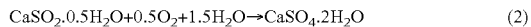

$$CaSO_3 \cdot 0.5H_2O + 0.5O_2 + 1.5H_2O \rightarrow CaSO_4 \cdot 2H_2O \qquad (2)$$

In this way, $SO_x$ contained in the flue gas 18 is captured in the desulfurization device 15 in the form of gypsum $CaSO_4 \cdot 2H_2O$.

Further, liquid, which is stored in the bottom portion 22 of the desulfurization device 15 and is pumped up, is used as the limestone slurry 20 as described above. However, the gypsum $CaSO_4 \cdot 2H_2O$ is mixed with the pumped limestone slurry 20 by the reaction formulae (1) and (2) with the operation of the desulfurization device 15. In the following description, limestone gypsum slurry (limestone slurry with which gypsum has been mixed) to be pumped is referred to as an absorbent.

An absorbent (limestone gypsum slurry), which is used for desulfurization, is discharged as the desulfurization waste water 30 to the outside from the bottom portion 22 of the desulfurization device 15, is sent to the dehydrator 32 through a waste water line $L_{20}$ to be described below, and is dehydrated here. Heavy metal such as mercury and halogen ions, such as $Cl^-$, $Br^-$, $I^-$, and $F^-$, other than gypsum are contained in this desulfurization waste water 30.

The dehydrator 32 is to separate a solid component, which contains the gypsum 31 of the desulfurization waste water 30, from a liquid component of the dehydrated filtrate 33. For example, a belt filter, a centrifugal separator, a decanter type centrifugal settler, and the like are used as the dehydrator 32. The gypsum 31 is separated from the desulfurization waste water 30, which is discharged from the desulfurization device 15, by the dehydrator 32. In this case, mercury chloride contained in the desulfurization waste water 30 is separated from liquid together with the gypsum 31 while being adsorbed in the gypsum 31. The separated gypsum 31 is discharged to the outside of the system.

Meanwhile, the dehydrated filtrate 33, which is separate liquid, is sent to the spray drying apparatus 50 through a dehydration line $L_{21}$. Meanwhile, the dehydrated filtrate 33 is temporarily stored in a waste water tank (not illustrated).

The spray drying apparatus 50 includes a gas introducing unit to which a part of the flue gas 18 is introduced through the flue gas introduction line $L_{11}$ branched from the flue gas supply line $L_2$ that is a main line for the flue gas 18 supplied from the boiler 11, and a spray unit for sprinkling or spraying the dehydrated filtrate 33. Further, the dehydrated filtrate 33, which has been sprinkled or sprayed, is evaporated and dried by the heat of the flue gas 18 to be introduced. Furthermore, the flue gas 18, which has contributed to drying in the spray drying apparatus 50, is directly supplied to the gas supply line $L_3$.

Since the dehydrated filtrate 33, which is obtained by removing the gypsum 31 from the desulfurization waste water 30, is sprayed and dried in the invention, it is possible to prevent the clogging of the spray unit.

That is, since the desulfurization waste water itself is not sprayed, it is possible to significantly reduce the amount of dry particles that are generated with the evaporation of the desulfurization waste water. As a result, it is possible to suppress clogging that is caused by the adhesion of the dry particles. Further, since the mercury chloride is also separated and removed together with the gypsum 31 by the dehydration of the desulfurization waste water 30, it is possible to prevent the increase of the concentration of mercury contained in the flue gas 18 when the waste water is sprayed.

Furthermore, since a part of the flue gas 18 flowing into the air heater 13 is branched from the flue gas supply line $L_2$ through the flue gas introduction line $L_{11}$ in this embodiment, the temperature of the flue gas is high (350 to 400° C.). Accordingly, it is possible to efficiently spray and dry the dehydrated filtrate 33.

Figure 2:
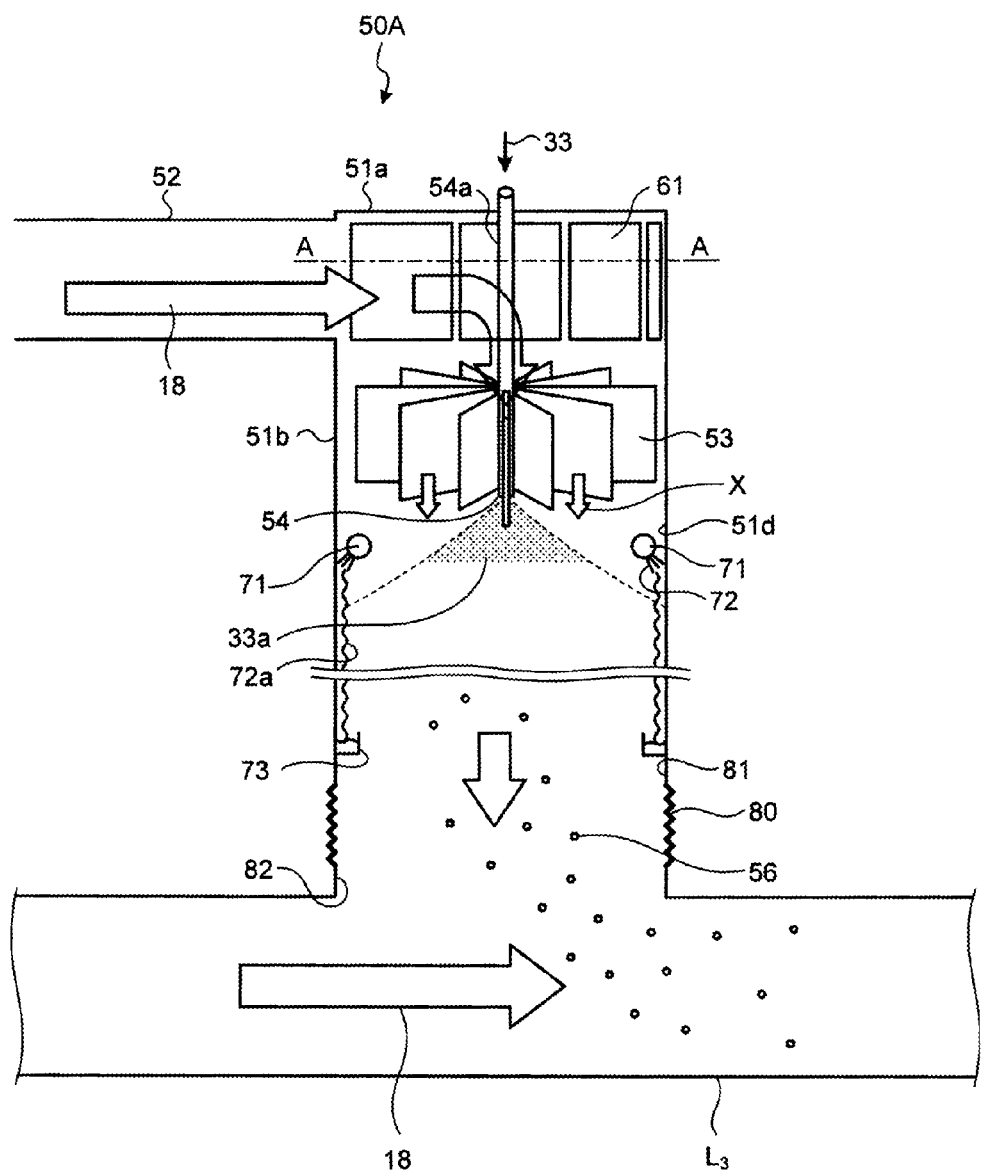
FIG. 2 is a schematic diagram illustrating a spray drying apparatus for dehydrated filtrate from desulfurization waste liquid according to the first embodiment.

FIG. 2 is a schematic diagram of the spray drying apparatus for dehydrated filtrate from desulfurization waste liquid according to this embodiment.

As illustrated in FIG. 2, a spray drying apparatus 50A according to this embodiment includes: a gas inlet 52 which is provided in a side wall 51b in the vicinity of a top (lid) portion 51a of a body of the spray drying apparatus, and through which a flue gas 18 for drying a spray 33a of dehydrated filtrate 33 is introduced; flow-adjusting plates 53 that are provided in the body of the spray drying apparatus, decelerate the introduced flue gas 18, and change the flow of the flue gas to a laminar flow X; a spray nozzle 54 that sprays the dehydrated filtrate 33 from the desulfurization waste water 30 into the flue gas 18 having been changed to the laminar flow X; and a joining unit 80 for joining the bottom portion of the body of the spray drying apparatus to a main flue gas duct for the flue gas 18 and discharging spray-dried solids to the main flue gas duct. Meanwhile, reference numeral 56 in FIG. 2 denotes ashes that are spray-dried solids.

Moreover, in this embodiment, protective plates 61, which prevent the abrasion of the inner wall surface caused by the solids contained in the flue gas 18, are provided along the wall in the introduction area of the flue gas 18 in the body of the spray drying apparatus 50A.

The reason for this is as follows: since the speed of the flow of the flue gas 18 to be introduced is in a range of, for example, about 10 to 18 m/s and the flue gas 18 is introduced in a tangential direction of the body of the apparatus, the protective plates 61 are installed to prevent the abrasion of an inner wall surface 51d of the body of the spray drying apparatus.

Figures 1, 3:
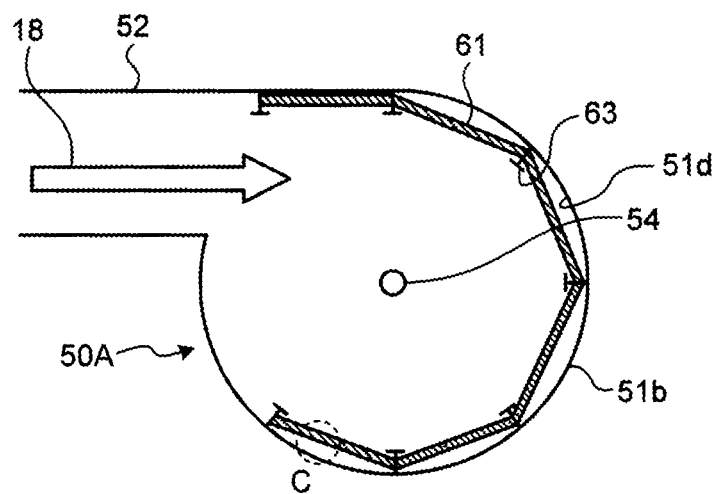
Figures 2, 3:
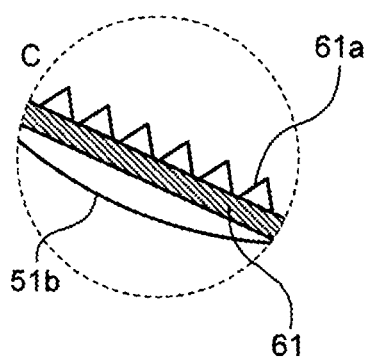

FIG. 3-1 is a cross-sectional view taken along line A-A of FIG. 2 and is a schematic diagram illustrating the installed state of the protective plates 61 that are provided at the top portion of the spray drying apparatus 50A. FIG. 3-2 is an enlarged view of a portion C of FIG. 3-1.

As illustrated in FIGS. 3-1 and 3-2, for example, rail-like insertion jigs 63 are provided on the inner wall surface 51d of the body of the spray drying apparatus 50A. Further, since the protective plates 61 are adapted to be easily pulled out from the insertion jigs 63 in a vertical direction, the protective plates can be replaced as necessary.

Much soot and dust such as ashes having high hardness are contained in the flue gas 18 supplied from the boiler 11. Furthermore, the inner wall surface 51d needs to be protected from the abrasion that is caused by the ashes having high hardness at the time of the collision of a swirl flow that is generated when the flue gas 18 flows in from the gas inlet 52. For this reason, the protective plates 61, which can be freely inserted, are provided along the inner wall surface 51d.

Meanwhile, the flue gas 18 is introduced into the spray drying apparatus 50A by a difference in pressure loss between the flue gas supply line $L_2$ and the flue gas introduction line $L_{11}$, or the flue gas 18 is introduced by using an induced draft fan or the like as necessary.

Moreover, an uneven surface 61a is further formed on the surface of the protective plate 61 as illustrated in FIG. 3-2, and the flow of the flue gas 18 is decelerated by the uneven surface 61a.

The uneven surface 61a, which is a deceleration unit, has been formed on the protective plate 61 in this embodiment. However, the invention is not limited thereto, and a gas deceleration unit may be separately and independently provided.

The flow-adjusting plates 53 are provided to further weaken the vortex flow of the flue gas 18 that collides with the protective plate 61.

The flow-adjusting plates 53 according to this embodiment are radially supported around a supply line 54a for the dehydrated filtrate 33, which is supplied to the spray nozzle 54, by a support unit (not illustrated). Further, the flue gas 18 is changed to a downward flow of a laminar flow X from a vortex flow (swirl flow) by the flow-adjusting plates 53.

Meanwhile, the flow-adjusting plates 53 may be vertically provided close to the inner wall surface 51d.

The dehydrated filtrate 33 is ejected as a spray 33a from the spray nozzle 54 to the flue gas 18 having been changed to the laminar flow X.

Here, as long as the spray nozzle 54 sprays the dehydrated filtrate 33 in the form of droplets having a predetermined diameter, the type of the spray nozzle 54 is not limited. For example, a spray unit, such as a two-fluid nozzle or a rotary atomizer, may be used. Meanwhile, a two-fluid nozzle is suitable to spray a relatively small amount of dehydrated filtrate 33, and a rotary atomizer is suitable to spray a relatively large amount of dehydrated filtrate 33.

Moreover, the number of nozzles is not one, and a plurality of nozzles may be provided according to the amount of dehydrated filtrate to be treated.

A washing unit for washing the inner peripheral wall surface of the spray drying apparatus 50A is provided in this embodiment.

The washing unit includes a washing nozzle 71 that injects washing liquid 72 over the entire inner wall surface 51d and forms a wet wall 72a, and a recovery gutter 73 that recovers falling liquid of the wet wall 72a.

The wet wall 72a is formed over the entire inner wall surface 51d so that the generation of a deposit precipitated from the flue gas 18 and the dehydrated filtrate 33 is prevented.

The washing unit may be installed as necessary, and may be omitted when the generation of a deposit is less.

Meanwhile, since a spray drying area in the spray drying apparatus 50A is desulfurization filtrate of which the boiling point is higher than the boiling point of general water so that the spray 33a sprayed from the spray nozzle 54 is dried well, the length of the spray drying area is changed according to the evaporation rate of the filtrate so that the residence time of the spray 33a is long.

The bottom portion of the spray drying apparatus 50A is joined to a flue gas duct-side opening 82 of the gas supply line $L_3$ of the main flue gas duct for the flue gas 18 by the joining unit 80 that is jointed to a bottom portion-side opening 81 of the spray drying apparatus. Further, the flue gas 18, which has contributed to the spraying and drying, is directly discharged into the flue gas duct through the joining unit 80.

For example, an expansion is exemplified as the joining unit 80 and prevents interference between the bottom portion of the spray drying apparatus 50A and the flue gas duct.

Furthermore, since the height of the spray drying apparatus 50A is in a range of about 8 to 10 m, the spray drying apparatus 50A is supported by struts or the like separate from the flue gas duct. Meanwhile, if the support of the flue gas duct is solid, the bottom portion of the spray drying apparatus 50A and the flue gas duct may be directly joined to each other by the joining unit 80 without support members.

Accordingly, a unit for discharging a flue gas and a unit for discharging ashes do not need to be installed unlike the case in which the spray drying apparatus is separately and independently installed. As a result, it is possible to simplify the structure of the apparatus.

According to this embodiment, in the spray drying apparatus 50A, the flue gas 18 is changed to the laminar flow X by the flow-adjusting plates 53 and the dehydrated filtrate 33 from the desulfurization waste water 30 is sprayed into the flue gas 18, which has been changed to the laminar flow X, from the spray nozzle 54. Accordingly, the dehydrated filtrate 33 is sprayed and dried well. In this case, since the abrasion, which is caused by the flue gas 18 colliding with the inner wall surface 51d when being introduced and discharged, is prevented by the protective plates 61, the durability of the spray drying apparatus 50A is improved.

In addition, since the washing unit for washing the inner portion of the spray drying apparatus 50A is provided and washing using the wet wall 72a is performed, it is possible to prevent the generation of scale on the inner wall surface by washing the high-concentration ashes 56 contained in the flue gas 18 and a large amount of precipitated salt after spraying and drying. Accordingly, the durability of the spray drying apparatus 50A is improved.

Second Embodiment

Figure 4:
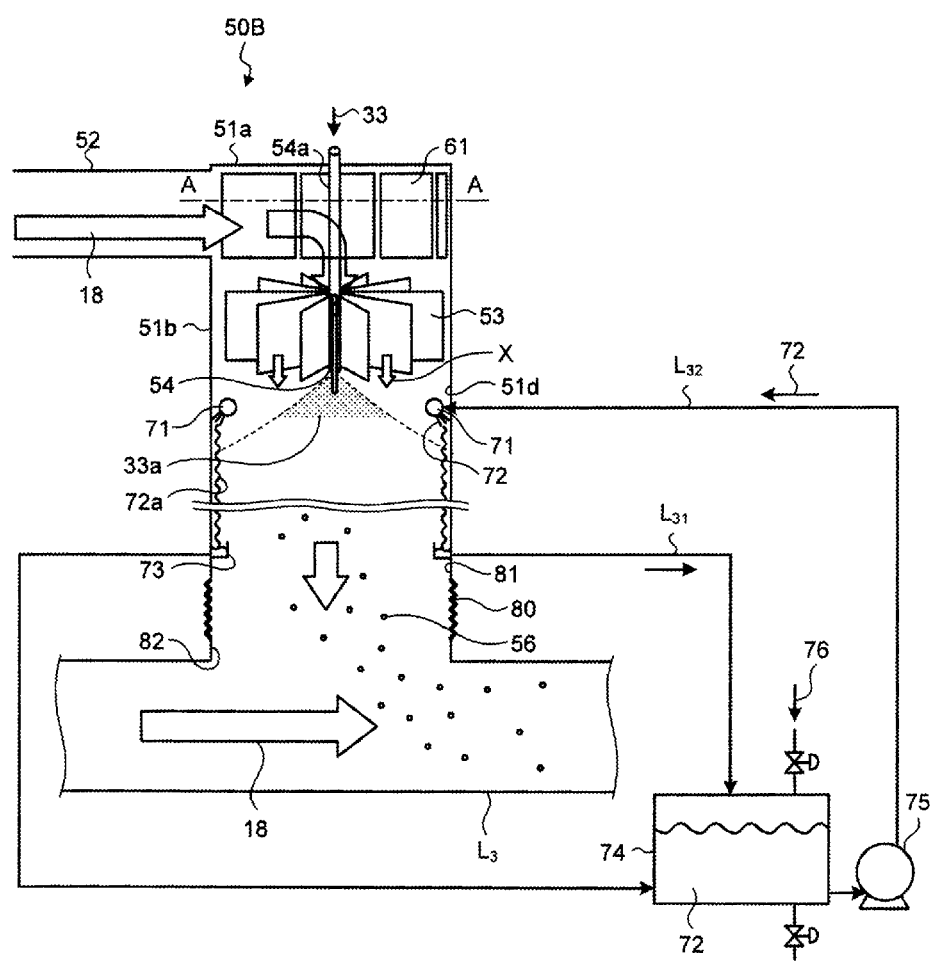
FIG. 4 is a schematic diagram of a spray drying apparatus for dehydrated filtrate from desulfurization waste liquid according to a second embodiment.

FIG. 4 is a schematic diagram of a spray drying apparatus for dehydrated filtrate from desulfurization waste water according to a second embodiment. Meanwhile, the same members as the members of the spray drying apparatus 50A of the first embodiment are denoted by the same reference numerals, and the description thereof will not be repeated.

As illustrated in FIG. 4, a spray drying apparatus 50B of this embodiment is provided with a washing liquid storage tank 74 that is used to recover and reuse washing liquid 72 of a washing unit.

A wet wall 72a, which is formed on the inner surface of a body of the spray drying apparatus, washes a precipitated deposit off. The washing liquid 72 is recovered by a recovery gutter 73 and is recovered to the washing liquid storage tank 74 through a recovery line $L_{31}$ and is stored. The washing liquid 72 is supplied again to a washing nozzle 71 through a washing liquid supply line $L_{32}$ by a circulating pump 75.

Further, since the concentration of the washing liquid 72 is increased if washing is continued for a long period of time, dilution water 76 is appropriately supplied to dilute the washing liquid. Furthermore, when the concentration of the washing liquid becomes equal to or higher than a predetermined value, a part of the washing liquid 72 is drawn from the washing liquid storage tank 74, and the washing liquid 72 is diluted with the same amount of the dilution water 76 as the drawn washing liquid. Then, washing is performed again.

REFERENCE SIGNS LIST

10 AIR POLLUTION CONTROL SYSTEM
11 BOILER
12 DENITRATION DEVICE
13 AIR HEATER
14 PRECIPITATOR
15 DESULFURIZATION DEVICE
16 COLLECTED DUST ASH
18 FLUE GAS
30 DESULFURIZATION WASTE WATER
32 DEHYDRATOR
33 DEHYDRATED FILTRATE
50A, 50B SPRAY DRYING APPARATUS
52 GAS INLET
53 FLOW-ADJUSTING PLATE
54 SPRAY NOZZLE
56 ASHES

The invention claimed is:
1. A spray drying apparatus for waste water,
the spray drying apparatus comprising:
a gas inlet that is provided in the vicinity of a top portion of a body of the spray drying apparatus and introduces a flue gas for drying a spray;
a flow-adjusting plate provided in the body of the spray drying apparatus;
a spray nozzle that sprays waste water as the spray into the flue gas having been flow-adjusted; and
a joining unit that connects a bottom of the body of the spray drying apparatus to a main flue gas duct so as to discharge spray-dried solids to the main flue gas duct along with the flue gas that has contributed to the drying of the spray,
wherein the joining unit is connected to an intermediate portion of the main flue gas duct such that the discharged spray-dried solids and the flue gas are provided to a midstream of main flue gas flowing in the main flue gas duct.
2. The spray drying apparatus according to claim 1, further comprising:
a supply line that is inserted from a top portion of the body of the spray drying apparatus into the body of the spray drying apparatus, provided in a vertical direction and supplies the waste water to the spray nozzle, wherein
the flow-adjusting plate includes a plurality of flow-adjusting plates that are radially provided around the supply line and each of the flow-adjusting plates has a first edge located on a supply line side thereof and a second edge located on an opposite side thereof, the second edge extending toward an inner periphery surface of the body of the spray drying apparatus.
3. The spray drying apparatus according to claim 1, wherein the joining unit is an expansion.
4. The spray drying apparatus according to claim 1, further comprising:
protective plates provided in the vicinity of a flue gas introduction area in the body of the spray drying apparatus and prevents abrasion of an inner wall surface of the body of the spray drying apparatus caused by solids contained in the flue gas, wherein
the protective plates are provided on and along the inner wall surface.
5. The spray drying apparatus according to claim 4, further comprising:
insertion jigs provided on the inner wall surface of the body of the spray drying apparatus, wherein
the protective plates are configured to be pulled out from the insertion jigs in a vertical direction.
6. The spray drying apparatus according to claim 4, wherein an uneven surface is formed on a surface of the protective plates.
7. The spray drying apparatus according to claim 1, further comprising:
a washing unit that washes an inner peripheral wall surface of the body of the spray drying apparatus.
8. The spray drying apparatus according to claim 1, wherein the flue gas is a flue gas discharged from a boiler for power generation.
9. The spray drying apparatus according to claim 1, wherein the spray-dried solids are vertically and downwardly discharged from the bottom of the body of the spray drying apparatus along with the flue gas that has contributed to the drying, and directed to the main flue gas duct.
10. The spray drying apparatus according to claim 2, wherein the plurality of flow-adjusting plates are oriented vertically, the flue gas introduced into the spray drying apparatus are decelerated by the plurality of flow-adjusting plates and the flow of the flue gas is changed to a laminar flow by the plurality of flow-adjusting plates.
11. An air pollution control system comprising:
a boiler that combusts fuel;
an air heater that recovers heat of a flue gas supplied from the boiler;
a precipitator that removes soot and dust contained in the flue gas from which heat has been recovered;
a desulfurization device that removes a sulfur oxide contained in the flue gas, from which soot and dust have been removed, by an absorbent;
a dehydrator that removes gypsum from desulfurization waste water discharged from the desulfurization device:
the spray drying apparatus according to claim 1 including the spray nozzle for spraying dehydrated filtrate supplied from the dehydrator as the spray liquid; and
a flue gas introduction line that is connected to the gas inlet provided in the spray drying apparatus to introduce a part of the flue gas to the spray drying apparatus.

12. The spray drying apparatus according to claim 1, wherein a route of the main flue gas is different from a route of the introduced flue gas flowing inside the body of the spray drying apparatus.

13. The spray drying apparatus according to claim 1, wherein the spray drying apparatus is configured that the introduced flue gas flows inside the body toward the bottom of the body and discharges from the bottom, and the main flue gas duct is disposed downstream of the spray drying apparatus.

14. The spray drying apparatus according to claim 1, wherein the spray drying apparatus is configured that the introduced flue gas flows vertically inside the body toward the bottom of the body and discharges from the bottom, and the main flue gas duct is disposed downstream of the spray drying apparatus.

* * * * *